UNITED STATES PATENT OFFICE.

PETER C. VOGELLUS, OF PHILADELPHIA, PENNSYLVANIA.

IMPROVEMENT IN SEPARATING TIN FROM TIN-SCRAP.

Specification forming part of Letters Patent No. 200,587, dated February 19, 1878; application filed October 8, 1877.

*To all whom it may concern:*

Be it known that I, PETER C. VOGELLUS, of Philadelphia, in the county of Philadelphia and State of Pennsylvania, have invented certain new and useful Improvements in Processes for Separating Tin from Tin-Scrap; and I do hereby declare the following to be a full, clear, and exact description of the invention, such as will enable others skilled in the art to which it pertains to make and use it.

My invention consists, essentially, in subjecting tin-scrap to the action of nitric or dilute nitric acid as a solvent of the tin, the iron which forms the base on which the tin has been laid being, while the nitric acid is at work, rendered passive by connection with the positive pole of an electric battery, or otherwise.

In carrying my invention into effect, I provide a tank, preferably constructed of wood, lined with fire-brick, one side and a portion of the floor of said tank, adjacent to said side and connected therewith, being composed of an electrical conductor which will resist the action of nitric acid when no electric current is established. This side of the tank and portion of the floor forms the positive electrode, while the other side of the tank is rendered conductive by lining with platina or platinized metal.

I connect what I have termed the "positive" and "negative" sides of the tank with the positive and negative poles, respectively, of an electric battery, and put into the tank (which should be a shallow vessel) a sufficient quantity of nitric acid or dilute nitric acid to wholly submerge the scrap which is to be treated. Said scrap is to be placed on the positive portion of the floor and against the positive side of the tank.

The effect of the nitric acid or dilute nitric acid is to unite with the tin and form peroxide of tin or meta-stannic acid, while the iron of the scrap, rendered passive by becoming the positive electrode, being electrically connected with the positive pole of the battery through the medium of the positive side of the tank, is not acted upon by the nitric acid. The scrap remains in the acid-bath until all the tin has been acted upon and converted into the peroxide, the mass being stirred from time to time to facilitate action. When the tin has thus been converted, the scrap is raked out of the bath and transferred to a tub containing running water, to remove any of the peroxide which may adhere to the iron. The peroxide remaining in the nitric-acid bath is recovered by any usual chemical manipulation, and that which is removed in the water-tub is taken from the latter by filtering. The iron is then dried, and is in condition for use and sale.

If the peroxide be not wholly removed by the water, it may be immersed in hydrochloric acid, which will unite with the peroxide, and be again treated with water, as before.

While I have specifically referred to the employment of an electric current for the purpose of rendering the iron passive during the process of removing the tin, I do not wish to be confined thereto. Other means have been discovered of rendering iron passive in nitric acid—as, for instance, by heating the iron, or by using acid of certain specific gravities.

My invention consists, essentially, in subjecting the tin-scrap to the action of nitric acid or dilute nitric acid while the iron is in a passive condition, irrespective of the means employed for rendering the iron passive.

I am aware that it has been attempted to remove the tin from tin-scrap in an electrolyzing-bath. My method differs from this in several essential particulars. In the first place, by the electrolyzing process, metallic tin is deposited in crystals, while I only dissolve the tin. In the second place, by the electrolyzing process, each piece of tin is handled separately, while I handle mine in bulk. In the third place, the electrolyzing process involves the use of alkalies, while I use nitric acid; and in the fourth place, I do not use an electrolyzing-bath at all, but simply employ the nitric acid as a solvent for the tin, and not as the liquid element of an electrolyzing-tub. In my process the electric current does not operate to remove the tin from the scrap, but simply to prevent the acid from affecting the iron.

What I claim as my invention is—

1. The process herein described, consisting in subjecting tin-scrap to the action of a nitric-acid or dilute nitric-acid bath, the iron of such scrap being rendered passive by connection with the positive pole of an electrical battery, substantially as shown and described.

2. The process herein described for the removal of tin from tin-scrap, consisting in subjecting the tin to the action of nitric acid or dilute nitric acid while the iron is in a passive condition, substantially as described.

In testimony that I claim the foregoing I have hereunto set my hand this 4th day of October, 1877.

PETER C. VOGELLUS.

Witnesses:
  JOS. B. CONNOLLY,
  CHAS. F. VAN HORN.